United States Patent
Park et al.

(10) Patent No.: US 9,967,014 B1
(45) Date of Patent: May 8, 2018

(54) BEAMFORMING IN ANTENNA SYSTEMS

(71) Applicant: Facebook, Inc., Menlo Park, CA (US)

(72) Inventors: Sungwoo Park, Austin, TX (US); Ali Yazdan Panah, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days. days.

(21) Appl. No.: 15/347,027

(22) Filed: Nov. 9, 2016

(51) Int. Cl.
*H04B 7/06* (2006.01)
*H04B 7/04* (2017.01)
(Continued)

(52) U.S. Cl.
CPC ......... *H04B 7/0617* (2013.01); *H04B 7/0456* (2013.01); *H04B 7/0452* (2013.01); *H04L 25/03343* (2013.01); *H04W 88/08* (2013.01)

(58) Field of Classification Search
CPC ............ H04L 25/03343; H04B 7/0452; H04B 7/0456
See application file for complete search history.

(56) References Cited

U.S. PATENT DOCUMENTS

| | | | | |
|---|---|---|---|---|
| 2010/0238984 A1* | 9/2010 | Sayana | ................ | H04B 7/0634 375/219 |
| 2010/0260234 A1* | 10/2010 | Thomas | ............... | H04B 1/7103 375/141 |

(Continued)

OTHER PUBLICATIONS

X. Zhang, A. Molisch, and S. Kung, "Variable-phase-shift-based RF-baseband codesign for MIMO antenna selection," IEEE Transactions on Signal Processing, vol. 53, No. 11, pp. 4091-4103, Nov. 2005.

(Continued)

*Primary Examiner* — Ross Varndell
(74) *Attorney, Agent, or Firm* — Brian R. Short

(57) ABSTRACT

Apparatuses, methods, and systems for beamforming in antenna systems are disclosed. A method includes determining an unconstrained analog precoding matrix ($F_{RF,UC}$), wherein the unconstrained analog precoding matrix ($F_{RF,UC}$) is determined based on M dominant eigenvectors of the sum of spatial channel covariance matrices of K users, and wherein K indicates a number of users communicating with a base station. The method further includes determining a constrained analog precoding matrix ($F_{RF}$) based on the unconstrained analog precoding matrix ($F_{RF,UC}$), determining a compensation matrix ($F_{CM}$), digitally multiplying K inputs with a multiple-input multiple-output (MIMO) precoding matrix ($F_{MU}$) generating M outputs, digitally multiplying the M outputs with the compensation matrix ($F_{CM}$) generating M compensation outputs, generating M analog frequency-up-converted signals based on the M compensation outputs, and analog multiplying the M analog frequency-up-converted signals with the analog precoding matrix ($F_{RF}$) generating N output signals for transmission, wherein N is greater than M.

17 Claims, 6 Drawing Sheets

(51) Int. Cl.

| | |
|---|---|
| *H04B 7/0456* | (2017.01) |
| *H04W 88/08* | (2009.01) |
| *H04L 25/03* | (2006.01) |
| *H04B 7/0452* | (2017.01) |

(56) References Cited

U.S. PATENT DOCUMENTS

| | | | |
|---|---|---|---|
| 2011/0176439 A1* | 7/2011 | Mondal | H04L 25/03343 370/252 |
| 2013/0034000 A1* | 2/2013 | Huo | H04L 25/03343 370/252 |
| 2014/0146756 A1* | 5/2014 | Sahin | H04L 1/0025 370/329 |
| 2015/0030092 A1* | 1/2015 | Krishnamurthy | H04B 7/0456 375/267 |
| 2015/0326285 A1 | 11/2015 | Zirwas et al. | |
| 2016/0080051 A1* | 3/2016 | Sajadieh | H04B 7/0456 375/267 |
| 2016/0119910 A1* | 4/2016 | Krzymien | H04B 7/0639 370/329 |
| 2016/0269090 A1 | 9/2016 | Kim et al. | |
| 2016/0308597 A1 | 10/2016 | Kim et al. | |
| 2017/0302353 A1* | 10/2017 | Rahman | H04B 7/0639 |

OTHER PUBLICATIONS

V. Venkateswaran and A. van der Veen, "Analog beamforming in MIMO communications with phase shift networks and online channel estimation," IEEE Transactions on Signal Processing, vol. 58, No. 8, pp. 4131-4143, Aug. 2010.

O. El Ayach, S. Rajagopal, S. Abu-Surra, Z. Pi, and R. Heath, "Spatially sparse precoding in millimeter wave MIMO systems," IEEE Transactions on Wireless Communications, vol. 13, No. 3, pp. 1499-1513, Mar. 2014.

W. Roh, J. Seol, J. Park, B. Lee, J. Lee, Y. Kim, J. Cho, K. Cheun, and F. Aryanfar, "Millimeter-wave beamforming as anenabling technology for 5G cellular communications: theoretical feasibility and prototype results," IEEE Communications Magazine, vol. 52, No. 2, pp. 106-113, Feb. 2014.

A. Alkhateeb, O. El Ayach, G. Leus, and R. Heath, "Hybrid precoding for millimeter wave cellular systems with partial channel knowledge," in Proc. of Information Theory and Applications Workshop, Feb. 2013, pp. 1-5.

X. Yu, J. Shen, J. Zhang, and K. Letaief, "Alternating minimization algorithms for hybrid precoding in millimeter wave MIMO systems," IEEE Journal of Selected Topics in Signal Processing, vol. 10, No. 3, pp. 485-500, Apr. 2016.

W. Ni and X. Dong, "Hybrid block diagonalization for massive multiuser MIMO systems," IEEE Transactions on Communications, vol. 64, No. 1, pp. 201-211, Jan. 2016.

L. Liang, W. Xu, and X. Dong, "Low-complexity hybrid precoding in massive multiuser MIMO systems," IEEE Wireless Communications Letters, vol. 3, No. 6, pp. 653-656, Dec. 2014.

F. Sohrabi and W. Yu, "Hybrid digital and analog beamforming design for large-scale antenna arrays," IEEE Journal of Selected Topics in Signal Processing, vol. 10, No. 3, pp. 501-513, Apr. 2016.

S. Han, C. I, C. Rowell, Z. Xu, S. Wang, and Z. Pan, "Large scale antenna system with hybrid digital and analog beamforming structure," in Proc. of IEEE International Conference on Communications Workshops, Jun. 2014, pp. 842-847.

A. Alkhateeb, G. Leus, and R. Heath, "Limited feedback hybrid precoding for multi-user millimeter wave systems," IEEE Transactions on Wireless Communications, vol. 14, No. 11, pp. 6481-6494, Nov. 2015.

R. Stirling-Gallacher and M. Rahman, "Multi-user MIMO strategies for a millimeter wave communication system using hybrid beamforming," in Proc. of IEEE International Conference on Communications, Jun. 2015, pp. 2437-2443.

T. Bogale and L. Le, "Beamforming for multiuser massive MIMO systems: Digital versus hybrid analog-digital," in Proc. of IEEE Global Communications Conference, Dec. 2014, pp. 4066-4071.

E. Zhang and C. Huang, "On achieving optimal rate of digital precoder by RF-baseband codesign for MIMO systems," in Proc. of IEEE Vehicular Technology Conference, Sep. 2014, pp. 1-5.

A. Adhikary, J. Nam, J. Ahn, and G. Caire, "Joint spatial division and multiplexing: The large-scale array regime," IEEE Transactions on Information Theory, vol. 59, No. 10, pp. 6441-6463, Oct. 2013.

L. Liang, Y. Dai, W. Xu, and X. Dong, "How to approach zero-forcing under RF chain limitations in large mmwave multiuser systems?" in Proc. of IEEE/CIC International Conference on Communications in China, Oct. 2014, pp. 518-522.

A. Alkhateeb, O. E. Ayach, G. Leus, and R. W. Heath, "Channel estimation and hybrid precoding for millimeter wave cellular systems," IEEE Journal of Selected Topics in Signal Processing, vol. 8, No. 5, pp. 831-846, Oct. 2014.

J. Lee, G. T. Gil, and Y. H. Lee, "Channel estimation via orthogonal matching pursuit for hybrid MIMO systems in millimeter wave communications," IEEE Transactions on Communications, vol. 64, No. 6, pp. 2370-2386, Jun. 2016.

S. Park, A. Alkhateeb, and R. Heath, "Dynamic subarrays for hybrid precoding in wideband mmWave MIMO systems," submitted to IEEE Transactions on Wireless Communications, arXiv preprint arXiv:1606.08405, 2016.

A. Liu and V. Lau, "Phase only RF precoding for massive MIMO systems with limited RF chains," IEEE Transactions on Signal Processing, vol. 62, No. 17, pp. 4505-4515, Sep. 2014.

A. Alkhateeb, R. W. Heath, and G. Leus, "Achievable rates of multi-user millimeter wave systems with hybrid precoding," in Proc. of IEEE International Conference on Communication Workshop, Jun. 2015, pp. 1232-1237.

S. Park and R. Heath, "Spatial channel covariance estimation for mmWave hybrid MIMO architecture," to appear in Proc. of Asilomar Conference on Signals, Systems and Computers, Nov. 2016.

C. Peel, B. Hochwald, and A. Swindlehurst, "A vector-perturbation technique for near-capacity multiantenna multiuser communication—Part I: channel inversion and regularization," IEEE Transactions on Communications, vol. 53, No. 1, pp. 195-202, Jan. 2005.

S. Wagner, R. Couillet, M. Debbah, and D. Slock, "Large system analysis of linear precoding in correlated MISO broadcast channels under limited feedback," IEEE Transactions on Information Theory, vol. 58, No. 7, pp. 4509-4537, Jul. 2012.

\* cited by examiner

BEAMFORMING IN ANTENNA SYSTEMS

FIELD OF THE DESCRIBED EMBODIMENTS

The described embodiments relate generally to wireless communications. More particularly, the described embodiments relate to systems, methods and apparatuses for beamforming in antenna systems.

BACKGROUND

Multiple-input multiple-output (MIMO) technology is commonly considered a potential candidate for next generation wireless communication, whereby a base station equipped with many antennas simultaneously communicates with multiple users sharing time and frequency resources. In wireless systems, transmitted signals to a user may cause interference in other systems. Also, many antennas require many radio frequency (RF) chains, which increase power consumption.

It is desirable to have apparatuses, methods, and systems for beamforming in multiple antenna systems.

SUMMARY

An embodiment includes a base station. The base station includes a baseband precoding circuitry, wherein the baseband precoding circuitry receives K inputs and digitally multiplies the K inputs with a MIMO precoding matrix ($F_{MU}$) generating M outputs, and wherein K indicates a number of users communicating with the base station. The base station further includes a compensation circuitry, wherein the compensation circuitry digitally multiplies the M outputs of the baseband precoding circuitry with a compensation matrix ($F_{CM}$) generating M compensation outputs. The base station further includes M RF chains, wherein each RF chain is configured to receive one of the M compensation outputs, and generate an analog frequency-up-converted signal. The base station further includes analog precoding circuitry, wherein the analog precoding circuitry receives the M analog frequency-up-converted signals and analog multiplies the M analog frequency-up-converted signals with a constrained analog precoding matrix ($F_{RF}$) generating N output signals for transmission, wherein N is greater than M, wherein the constrained analog precoding matrix ($F_{RF}$) is determined based on an unconstrained analog precoding matrix ($F_{RF,UC}$), and wherein the unconstrained analog precoding matrix ($F_{RF,UC}$) is determined based on M dominant eigenvectors of the sum of spatial channel covariance matrices of the K users.

Another embodiment includes a method. The method includes determining an unconstrained analog precoding matrix ($F_{RF,UC}$), wherein the unconstrained analog precoding matrix ($F_{RF,UC}$) is determined based on M dominant eigenvectors of the sum of spatial channel covariance matrices of K users, and wherein K indicates a number of users communicating with a base station. The method further includes determining a constrained analog precoding matrix ($F_{RF}$) based on the unconstrained analog precoding matrix ($F_{RF,UC}$). The method further includes determining a compensation matrix ($F_{CM}$) based on the constrained analog precoding matrix ($F_{RF}$). The method further includes digitally multiplying K inputs with a MIMO precoding matrix ($F_{MU}$) generating M outputs. The method further includes digitally multiplying the M outputs with the compensation matrix ($F_{CM}$) generating M compensation outputs. The method further includes generating M analog frequency-up-converted signals based on the M compensation outputs. The method further includes analog multiplying the M analog frequency-up-converted signals with the analog precoding matrix ($F_{RF}$) generating N output signals for transmission, wherein N is greater than M.

Another embodiment includes a system. The system includes one or more processors, and includes logic encoded in one or more non-transitory computer-readable storage media for execution by the one or more processors. When executed, the logic is operable to perform operations including determining an unconstrained analog precoding matrix ($F_{RF,UC}$), wherein the unconstrained analog precoding matrix ($F_{RF,UC}$) is determined based on M dominant eigenvectors of the sum of spatial channel covariance matrices of K users, and wherein K indicates a number of users communicating with a base station. The logic when executed is further operable to perform operations including determining a constrained analog precoding matrix ($F_{RF}$) based on the unconstrained analog precoding matrix ($F_{RF,UC}$). The logic when executed is further operable to perform operations including determining a compensation matrix ($F_{CM}$) based on the constrained analog precoding matrix ($F_{RF}$). The logic when executed is further operable to perform operations including digitally multiplying K inputs with a MIMO precoding matrix ($F_{MU}$) generating M outputs. The logic when executed is further operable to perform operations including digitally multiplying the M outputs with the compensation matrix ($F_{CM}$) generating M compensation outputs. The logic when executed is further operable to perform operations including generating M analog frequency-up-converted signals based on the M compensation outputs. The logic when executed is further operable to perform operations including analog multiplying the M analog frequency-up-converted signals with the analog precoding matrix ($F_{RF}$) generating N output signals for transmission, wherein N is greater than M.

Aspects and advantages of the described embodiments will become apparent from the following detailed description, taken in conjunction with the accompanying drawings, illustrating by way of example of the principles of the described embodiments.

DETAILED DESCRIPTION

At least some embodiments described include methods, apparatuses, and systems for providing hybrid analogue-digital beamforming in multi-antenna systems. For at least some embodiments, a base station includes a baseband precoding circuitry, wherein the baseband precoding circuitry receives K inputs and digitally multiplies the K inputs with a MIMO precoding matrix $F_{MU}$ generating M outputs, and wherein K indicates a number of users communicating with the base station. The base station further includes a compensation circuitry, wherein the compensation circuitry digitally multiplies the M outputs of the baseband precoding circuitry with a compensation matrix $F_{CM}$ generating M compensation outputs. The base station further includes M RF chains, wherein each RF chain is configured to receive one of the M compensation outputs, and generate an analog frequency-up-converted signal. The base station further includes analog precoding circuitry, wherein the analog precoding circuitry receives the M analog frequency-up-converted signals and analog multiplies the M analog frequency-up-converted signals with a constrained analog precoding matrix $F_{RF}$ generating N output signals for transmission, wherein N is greater than M, wherein the constrained analog precoding matrix $F_{RF}$ is determined based on an unconstrained analog precoding matrix $F_{RF,UC}$, and wherein the unconstrained analog precoding matrix $F_{RF,UC}$ is determined based on M dominant eigenvectors of the sum of spatial channel covariance matrices of the K users.

At least some embodiments provide a hybrid precoding technique for massive MIMO systems using long-term channel statistics. As described in more detail herein, constraining the baseband precoding matrix to a regularized zero-forcing precoder, an unconstrained analog precoder improves the signal-to-leakage-plus-noise ratio (SLNR) while ignoring any analog phase shifter constraints. Subsequently, for an embodiment, a constrained analog precoder mimics the obtained unconstrained analog precoder under phase shifter constraints. At least some embodiments also involve the adoption of an additional baseband precoding matrix, referred to as a "compensation matrix." If the number of channels correlated and the number of users is smaller than the number of RF chains, the performance loss becomes negligible compared to full digital precoding. Benefits of at least some embodiments described herein stem from the use of long-term channel statistics in such a way that the analog precoder improves each user's desired signal, and also reduces inter-user interference.

Figure 1:
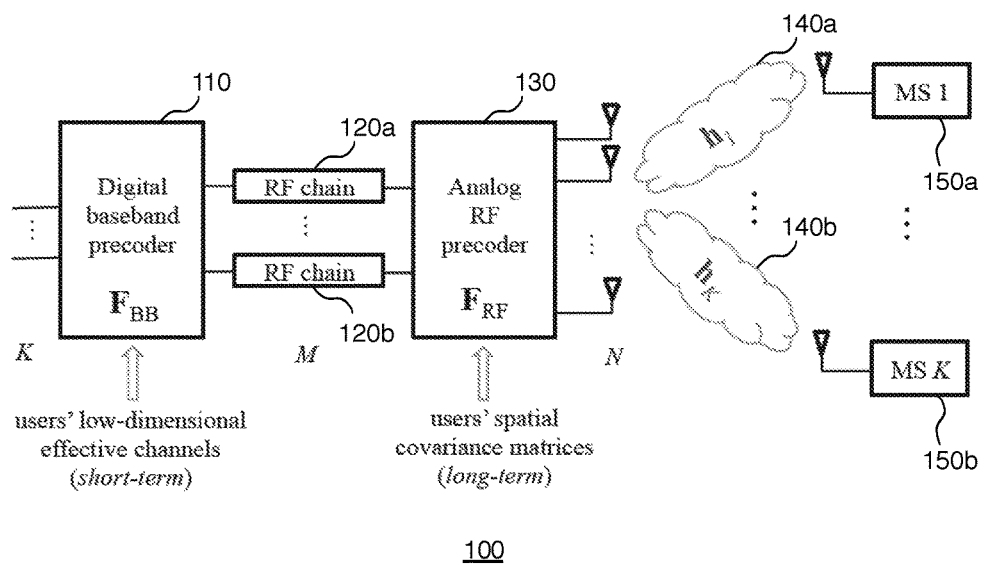
FIG. 1 shows a base station environment, according to an embodiment.

FIG. 1 shows a base station environment 100, according to an embodiment. Base station environment 100 may also be referred to as a downlink multiuser MIMO system. As shown, a base station includes a digital baseband precoder 110, RF chains 120a and 120b, and analog RF precoder 130. The base station transmits data across one or more transmissions channels 140a and 140b to mobile stations 150a and 150b (also labeled MS 1 and MS K, respectively).

For an embodiment, a base station is equipped with N antennas and M RF chains, which simultaneously communicate with K users sharing time and frequency resources. In wireless systems, a simultaneously transmitted signal to a user acts as an interference to other systems. To overcome this problem, the base station exploits so-called precoding techniques that reduce interference in advance with prior knowledge of the wireless channel state. In spite of its potential for increasing system throughput and reliability, conventional hybrid precoding techniques in massive MIMO systems require high power consumption because each antenna requires its own RF chain, and there may be many RF chains.

Figure 2:
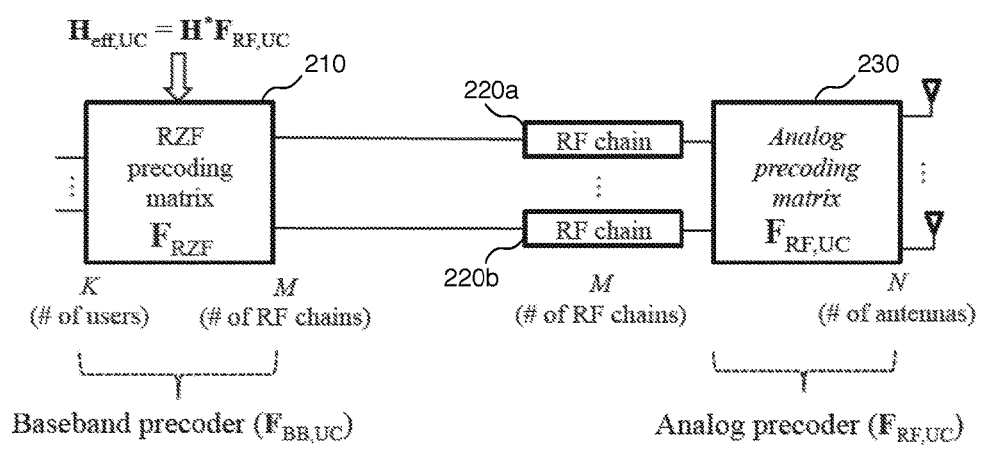
FIG. 2 shows a base station performing unconstrained hybrid precoding, according to an embodiment.

FIG. 2 shows a base station 200 performing unconstrained hybrid precoding, according to an embodiment. As shown, base station 200 includes a baseband precoder 210, which processes an RZF precoding matrix. Base station 200 also includes RF chains 220a and 220b, and analog precoder 230, which processes an analog precoding matrix 232.

For an embodiment, base station 200 performs hybrid analog/digital precoding, which enables the use of fewer RF chains than antennas (M<N). As described in more detail herein, for an embodiment, the base station 200 achieves this by using long-term channel statistics instead of instant channel state information.

In at least one embodiments, the channels vary over time, where, for example, the user k's N×1 channel vector, $h_k$, varies over time, where $h_k(1), h_k(2), \ldots, h_k(T)$ are not the same, and where N is the number of antennas. This may be referred to an "instance channel" at a particular time. The user k's spatial channel covariance may be defined as $R_k = \mathbb{E}[h_k h_k^*]$.

The user k's spatial channel covariance may be estimated as $$R_k \approx \frac{1}{T}\sum_{t=1}^{T} h_k(t)h_k^*(t).$$

This spatial channel covariance does not change at every time slot (where a time slot is predetermined period of time), and slowly changes in the long-term (e.g., changes less than a threshold amount over a predetermined number of time slots), if at all. As such, the "spatial channel covariance" is one of the "long-term channel statistics." Other long-term channel statistics may include mean and variance.

This spatial channel covariance matrix may contain the information about the number of dominant channel paths between a base station and a mobile station, and may contain the information about the channel paths' angles relative to the antenna bore-sight. At least some embodiments exploit this information contained in the spatial channel covariance in that the analog precoding matrix is based on the spatial channel covariance matrix.

More specifically, at least some embodiments, use the spatial channel covariance, which is one of long-term channel statistics, in the design of the analog precoding matrix, rather than using instant channel information, $h_k$'s.

The spatial channel covariance matrix is used for the design of the unconstrained analog precoding matrix $F_{RF,UC}$, and the unconstrained analog precoding matrix $F_{RF,UC}$ is used for the design of the constrained analog precoding matrix $F_{RF}$. The process that obtains the unconstrained matrix $F_{RF,UC}$ is just an interim process to obtain the constrained matrix $F_{RF}$, which is the actual analog precoding matrix. As such the spatial channel covariance matrix is used for the design of the unconstrained precoding matrix as well.

Hybrid analog/digital transmit precoding described herein reduces power consumption by using a reduced set of RF chains while maintaining a large number of physical antennas. The hybrid precoding method essentially divides the precoding process at the transmitter between the analog RF and digital baseband part.

At least some embodiments use long-term channel statistics, e.g., spatial channel covariance in the analog precoder instead of instantaneous channel knowledge with respect to analog precoding. Firstly, as its name implies, long-term channel statistics show much less variation in time compared to instantaneous channels, which makes it easier to estimate. Further, long-term channel statistics such as spatial channel covariance are typically uniform across all subcarriers. At least some embodiments of the analog precoder use the long-term channel statistics.

Figure 3:
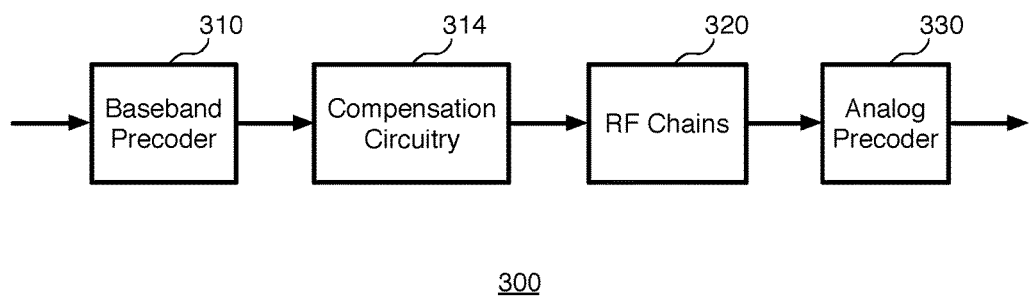
FIG. 3 shows a base station, according to an embodiment.

FIG. 3 shows a base station 300, according to an embodiment. As shown, base station 300 includes a baseband precoder 310, compensation circuitry 314, RF chains 320, and an analog precoder 330. Baseband precoder 310 receives K inputs and digitally multiplies the K inputs with a MIMO precoding matrix $F_{MU}$ generating M outputs, and where K indicates a number of users communicating with the base station. For an embodiment, the MIMO precoding matrix $F_{MU}$ is determined based on an effective channel matrix that includes one or more of a constrained analog precoding matrix $F_{RF}$, the compensation matrix $F_{CM}$, and a raw channel matrix.

In at least some embodiments, the raw channel matrix indicates the actual channel matrix between the physical antennas at the base station and the single antenna at the mobile station's. The (n, k)-th element of the actual (raw) channel matrix is the actual channel path gain between the n-th physical antenna at the base station and the antenna at the k-th mobile station.

In at least some embodiments, the output of the baseband precoding in the base station is not directly connected to the physical antennas, but connected to the physical antennas through the analog precoding matrix. That is, the output of baseband precoding is connected to the RF chains. As such, from the viewpoint of the baseband precoding, the RF chains may be regarded as effective antennas (e.g., not actual physical antennas). In this case, the effective channel becomes the combination of the analog precoding and the actual (raw) channel, e.g., $H_{eff,UC}=H'F_{RF,UC}$. More specifically, in the constrained case, the effective channel from the viewpoint of the baseband MU(RZF) precoding, $F_{RZF}$, the effective channel is the combination of the compensation matrix, the analog precoding matrix, and the actual channel matrix, e.g., $H_{eff,c}=H'F_{RF,c}F_{CM}$.

Compensation circuitry 314 digitally multiplies the M outputs of baseband precoder 310 with a compensation matrix $F_{CM}$ generating M compensation outputs. For an embodiment, the compensation matrix $F_{CM}$ is determined based on the constrained analog precoding matrix $F_{RF}$. For an embodiment, K is less than or equal to M. For an embodiment, analog precoder 330 includes constrained analog precoding circuitry that includes phase shifters.

In an embodiment, there are M RF chains, where each RF chain is configured to receive one of the M compensation outputs, and generate an analog frequency-up-converted signal. Analog precoder 330 receives the M analog frequency-up-converted signals and analog multiplies the M analog frequency-up-converted signals with a constrained analog precoding matrix $F_{RF}$ generating N output signals for transmission, where N is greater than M.

As described in more detail herein, the constrained analog precoding matrix $F_{RF}$ may be determined based on an unconstrained analog precoding matrix $F_{RF,UC}$. Also, the unconstrained analog precoding matrix $F_{RF,UC}$ may be determined based on M dominant eigenvectors of the sum of spatial channel covariance matrices of the K users.

In at least some embodiments, the phase shifter constraint is initially ignored in the determination of the analog precoding matrix, and the best analog precoding matrix is found in order to improve the spectral efficiency, based on the spatial channel covariance matrices.

In at least some embodiments, the spectral efficiency may be defined as {data transfer rate (bits per second)/bandwidth (Hz)}. The "data transfer rate" is simply referred to as the rate or throughput. In addition, if multiple users are simultaneously receiving data from a base station, the sum of all the users' rate may be referred to as the "sum rate." Since the bandwidth is a fixed constant, maximizing the "spectral efficiency" is equivalent to maximizing the "rate." The term "spectral efficiency" may be used interchangeably with the terms "rate," "throughput," or "data transfer rate."

After summing up the spatial channel covariance matrices of all users, eigenvalues of the sum matrix are calculated by using an eigenvalue decomposition. Then, the unconstrained analog precoding matrix is constructed such that its M columns are composed of the M eigenvectors associated with the M largest eigenvalues, which are so-called M dominant eigenvectors.

In at least some embodiments, selecting the largest eigenvalues depends on the number of RF chains that a base station has. That is, the base station already knows how many eigenvalues are to be selected. For some embodiments, the number of eigenvalues selected is based on the number of RF chains that the base station has. If the base station has N antennas, then there exist N eigenvalues. If M RF chains are equipped in the base station, the base station selects M eigenvalues among N eigenvalues. For at least an embodiment, the selection criterion is to choose M largest eigenvalues. In other words, the base station arranges the N eigenvalues in a descending order, and then selects the first M eigenvalues in that descending order.

After finding the unconstrained analog precoding matrix, which ignores the phase shifter constraint, the actual analog precoding matrix may be determined based on application of the phase shifter constraint. For at least an embodiment, to reduce the loss caused by the phase shifter constraint, the compensation matrix is applied in order to compensate for the loss. As such, if the phase shifter constraint is not applied, the compensation matrix may be ignored, as it is would not be necessary.

In at least some embodiments, the constrained analog precoding matrix combined with the compensation matrix is equivalent to the unconstrained analog precoding matrix, and there is no loss from the phase shifter constraint. In at least some embodiments, the combined constrained matrix is as similar to the unconstrained matrix as possible. The Frobenius norm of the difference between two matrices may be used as a metric to define similarity, where the smaller the metric, the more similar the two matrices.

For an embodiment, multiplication of the unconstrained analog precoding matrix $F_{RF,UC}$ with any invertible matrix is substantially equal to the constrained analog precoding matrix $F_{RF}$. For an embodiment, the analog multiplication of the unconstrained analog precoding matrix ($F_{RF,UC}$) controls phases of the analog frequency-up-converted signals.

Figure 4:
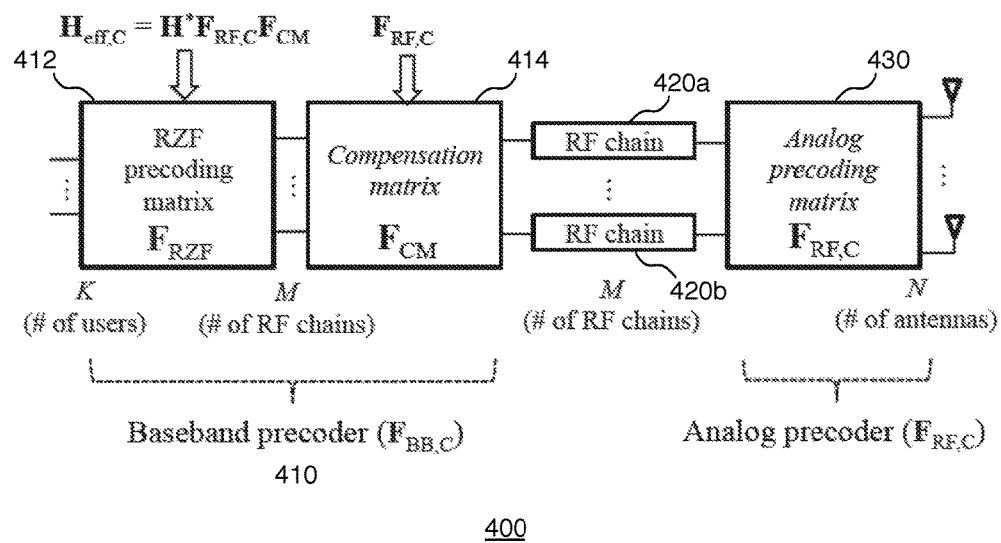
FIG. 4 shows a base station performing constrained hybrid precoding, according to an embodiment.

FIG. 4 shows a base station 400 performing constrained hybrid precoding, according to an embodiment. As shown, base station 400 includes a baseband precoder 410 that includes a digital precoder 412, which processes an RZF precoding matrix. Baseband precoder 410 also includes compensation circuitry 414 that processes a compensation matrix. Base station 400 also includes RF chains 420a and 420b, and an analog precoder 430, which processes an analog precoding matrix.

Baseband precoder 410 and compensation circuitry 414 constitute a digital baseband portion of base station 400, and analog precoder 430 is an analog RF portion of base station 400.

Fixing a baseband precoder as regularized zero-forcing, at least some embodiments obtain an unconstrained analog precoder that improves the SLNR ignoring the fact that analog precoding is typically realized with phase shifters (e.g., so-called phase shifter constraints may be ignored).

For an embodiment, the obtained unconstrained analog precoder may be configured to use a channel covariance matrix.

As described in more detail herein, analog precoder 430 of base station 400 applies a phase shifter constraint, such that the analog precoding matrix $F_{RF}$ is a constrained analog precoding matrix $F_{RF}$, composed of phase shifters such that the phase of a signal is controlled, and where the amplitude of a signal is not controlled.

For an embodiment, a constrained analog precoder mimics the obtained unconstrained analog pre-coder while satisfying the phase shifter constraints. The key idea is adopting an additional baseband precoder, referred to as a compensation matrix whose main role is mitigating the loss caused by using phase shifters. Although this compensation matrix is operated in the baseband, for an embodiment, the compensation matrix may depend on the long-term channel statistics, thereby requiring no instantaneous channel state information at transmitter (C SIT). Leveraging this compensation matrix concept, the constrained analog precoder may be improved so that the combination of the constrained analog precoder and the compensation matrix is as similar to the unconstrained matrix as possible.

At least some embodiments achieve long-term CSIT for the analog precoding matrix $F_{RF}$, and may be applied for wideband systems (e.g., frequency selective). At least some embodiments may be applied to massive MIMO cellular systems, to low-power consumption base stations (e.g., equipped unmanned aircraft or balloons, etc.), and to next generation wireless communication systems (e.g., millimeter wave systems, etc.).

A benefit of at least some embodiments described herein is that they do not dedicate an RF chain to a user (or a group of RF chains to a user group). Dedicating RF chains to users is not efficient in that its applicability is restricted to the case when the number of users is equal to the number of RF chains. Instead, at least some embodiments described herein improve the performance in a general system environment. At least some embodiments may be applied to the case when fewer users than RF chains are assigned, which is beneficial in a realistic scenario where the number of assigned users varies over time but the number of RF chains is fixed.

Under the phase shifter constraints, the constrained analog precoder with the compensation matrix results in almost the same spectral efficiency as the unconstrained analog precoder. In addition, the loss from the hybrid precoding can be low, although the proposed technique utilizes long-term channel statistics in the design of the analog precoder, promoting the employment of massive MIMO systems in practical real-world cellular networks.

Figure 5:
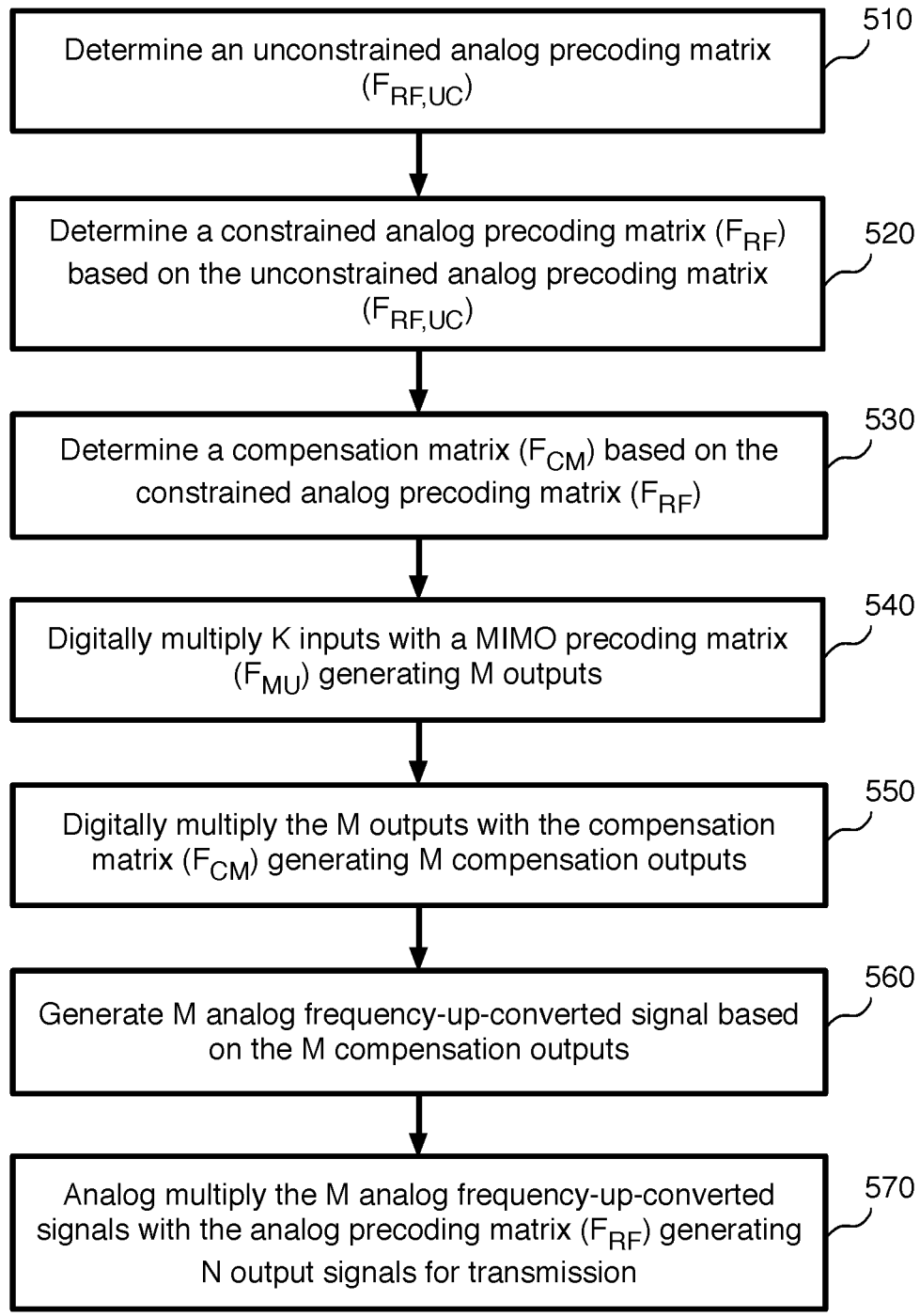
FIG. 5 shows a flow chart that includes acts of a method, according to an embodiment.

FIG. 5 is a flow chart that includes acts of a method, according to an embodiment. A first step 510 includes determining an unconstrained analog precoding matrix $F_{RF,UC}$, where unconstrained analog precoding matrix $F_{RF,UC}$ is unconstrained in that a phase shifter constraint is not applied. For an embodiment, the unconstrained analog precoding matrix $F_{RF,UC}$ is determined based on M dominant eigenvectors of the sum of spatial channel covariance matrices of K users, and where K indicates a number of users communicating with a base station.

A second step 520 includes determining a constrained analog precoding matrix $F_{RF}$, where unconstrained analog precoding matrix $F_{RF,UC}$ is unconstrained in that a phase shifter constraint is not applied. For an embodiment, the constrained analog precoding matrix $F_{RF}$ is based on the unconstrained analog precoding matrix $F_{RF,UC}$.

As indicated herein, the constrained analog precoding matrix $F_{RF}$ is performed by constrained analog precoding circuitry, which includes phase shifters.

Figure 6:
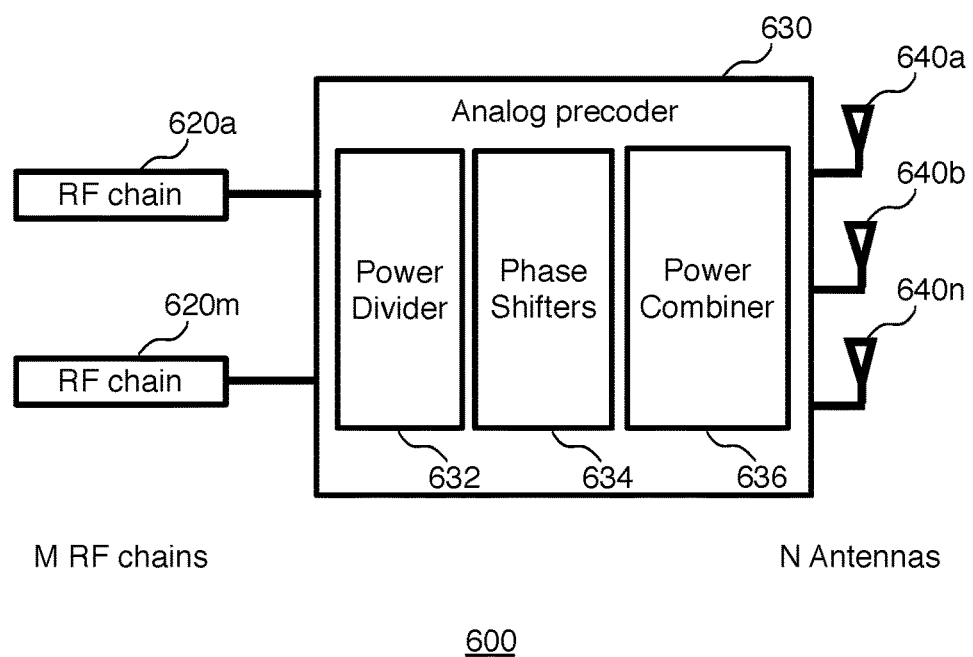
FIG. 6 shows a portion of a base station including an analog precoder with phase shifters, according to an embodiment.

FIG. 6 shows a portion of a base station 600 including an analog precoder 630 with phase shifters, according to an embodiment. As shown, base station 600 includes RF chains 620a to 620m, a power divider 632, phase shifters 634, a power combiner 636, and antennas 640a, 640b to 640n. In at least some embodiments, base station 600 includes M RF chains and N antennas, where there are fewer RF chains than antennas. In other words, M<N.

A third step 530 includes determining a compensation matrix $F_{CM}$. For an embodiment, the compensation matrix $F_{CM}$ is determined based on the constrained analog precoding matrix $F_{RF}$.

For an embodiment, wherein multiplication of the constrained analog precoding matrix $F_{RF}$ and the compensation matrix $F_{CM}$ is substantially equal to the unconstrained analog precoding matrix $F_{RF,UC}$, where $F_{RF}F_{CM} \approx F_{RF,UC}$.

A fourth step 540 includes digitally multiplying K inputs with a MIMO precoding matrix $F_{MU}$ generating M outputs. As indicated herein, the MIMO precoding matrix $F_{MU}$ may be determined based on an effective channel matrix that includes one or more of the constrained analog precoding matrix $F_{RF}$, the compensation matrix $F_{CM}$, and a raw channel matrix.

For an embodiment, the analog precoding matrix $F_{RF,C}$ provides phase control of a signal, and the MIMO precoding matrix $F_{MU}$ provides phase and amplitude control of a signal. For an embodiment, where the phase shifter constraints are not applied, the unconstrained analog precoding matrix is a conceptual precoder that is used for the calculation of the actual analog precoder. If the phase shifter constraints are not applied, it is sufficient to calculate just the unconstrained analog precoding matrix $F_{RF,UC}$. In at least some embodiments, once the unconstrained analog precoding matrix $F_{RF,UC}$ is obtained, the process for the design of both the compensation matrix and the constrained matrix is not necessary.

A fifth step 550 includes digitally multiplying the M outputs with the compensation matrix $F_{CM}$ generating M compensation outputs.

A sixth step 560 includes generating M analog frequency-up-converted signals based on the M compensation outputs.

A seventh step 570 includes analog multiplying the M analog frequency-up-converted signals with the analog precoding matrix $F_{RF}$ generating N output signals for transmission, wherein N is greater than M.

The following descriptions describe further embodiments in detail. The following notation may be used throughout. A is a matrix, a is a vector, a is a scalar, and $\mathcal{A}$ is a set. $|a|$ and $\angle a$ are the magnitude and phase of the complex number a. $\|A\|_F$ is its Frobenius norm, and $A^T$, $A^*$, and $A^{-1}$ are its transpose, Hermitian, (conjugate transpose), and inverse, respectively. $[A]_{m,n}$ is the (m, n)-th element of the matrix A. $\angle A$ is a matrix with the (m, n)-th element equals $e^{j[\angle A]_{m,n}}$. $I_N$ is an N×N identity matrix and $0_{N \times m}$ is an N×M matrix whose elements are all zeros. $\mathcal{CN}$ (m, R) is a complex Gaussian random vector with mean m and covariance R. E [•] is used to denote expectation.

Consider a downlink system where a base station (BS) equipped with N antennas and M(≤N) RF chains communicates with K(≤M) users with a single antenna. Let $F_{RF} \in \mathbb{C}^{N \times M}$, $F_{BB} \in \mathbb{C}^{M \times K}$, and $s \in \mathbb{C}^{K \times 1}$ be an analog RF precoder, a digital baseband precoder, and a signal vector, respectively. The transmit signal is given by $$x = F_{RF}F_{BB}Ps, \quad (1)$$

where $P \in \mathbb{R}^{K \times K}$ is a diagonal matrix to maintain the total transmit power $P_{tx}$.

The received signal is given by $$y = H^*x + n = H^*F_{RF}F_{BB}Ps + n, \quad (2)$$

where $n \in \mathbb{C}^{K \times 1} \sim \mathcal{CN}(0, \sigma^2 I)$ is circularly symmetric complex Gaussian noise, and $H^* \in \mathbb{C}^{K \times N}$ is a downlink channel matrix for all users. Considering spatially correlated channels, each MS has its own spatial channel covariance matrix and the channel is modeled as $$H = [h_1 \ \ldots \ h_K] = [R_1^{\frac{1}{2}} h_{w,1} \ \ldots \ R_K^{\frac{1}{2}} h_{w,K}], \quad (3)$$

where $h_{w,K}$ has IID complex entries of zero mean and unit variance, and $R_k = E[h_k h_k^*]$ is a spatial channel covariance matrix of user k. This presumes that $R_k$'s have been obtained through covariance estimation for the hybrid structure.

Assuming that the analog precoding is composed of phase shifters, a constraint on $F_{RF}$ is imposed that all elements in $F_{RF}$ have the same amplitude. For an embodiment, there is another constraint that $F_{RF}$ is designed by using $R_k$'s, not $h_k$'s. In at least some embodiments, there are three constraints on hybrid precoding that may be applied.

Constraint 1: The number of RF chains is less than the number of antennas (M<N).

Constraint 2: $F_{RF}$ is fixed over time and/or frequency and may depend on long-term channel statistics.

Constraint 3: $F_{RF}$ is composed of phase shifters (e.g., all the elements in $F_{RF}$ have the same amplitudes).

In at least some embodiments described herein, h, $h_{w,k}$, and n are regarded as random variables, and $R_k$'s as deterministic variables.

In at least some embodiments, hybrid precoding using long-term channel statistics is used, where constraints 1 and 2 are applied. For an embodiment, to determine an unconstrained analog precoding matrix (applying constraints 1 and 2, but not constraint 3), and, presuming long-term channel statistics to design $F_{RF}$, each column of $F_{RF}$ is assigned to each MS as $$F_{RF} = [v_{1,max} \ \ldots \ v_{K,max}], \quad (4)$$

where $v_{K,max}$ is a dominant eigenvector of $R_k$.

Once $F_{RF}$ is decided, the baseband precoder adopts conventional MU-MIMO techniques such as zero-forcing (ZF) or regularized zero-forcing (RZF) with respect to the combined effective channel $H_{eff}^* = H^* F_{RF}$. The rationale behind this technique is to improve the long-term average power of the desired signal in the analog part. The main drawback of this approach is, however, not considering the interference in the analog part, which results in performance degradation unless the channel is ideally orthogonal. Moreover, this technique cannot be directly applied when K<M.

For an embodiment, a focus on the RZF case may be $$F_{BB} = [f_{BB,1} \ \ldots \ f_{BB,K}] = (F_{RF}^* H H^* F_{RF} + \beta I_M)^{-1} F_{RF}^* H, \quad (5)$$

where β is a regularization parameter and is set as $$\beta = \frac{K\sigma^2}{P_{tx}} = \frac{K}{\rho},$$

where $$\rho = \frac{P_{tx}}{\sigma^2}$$

denotes the transmit SNR. Considering an equal power strategy that makes each user's power equal after precoding including both $F_{RF}$ and $F_{BB}$, the k-th diagonal element of P in (1) is $$p_k = \frac{\sqrt{P_{tx}}}{\sqrt{K} \|F_{RF} f_{bb,k}\|} = \sqrt{\frac{P_{tx}}{K h_k^* W^2 h_k}}, \quad (6)$$

where $$W = F_{RF}\left(F_{RF}^* H H^* F_{RF} + \frac{K}{\rho} I_M\right)^{-1} F_{RF}^*.$$

The instantaneous SLNR can be written as $$\begin{aligned}SLNR_k &= \frac{|h_k^* F_{RF} f_{bb,k}|^2}{\sum_{i \neq k} |h_i^* F_{RF} f_{bb,k}|^2 + \|F_{RF} f_{bb,k}\|^2 \left(\frac{\sigma^2}{|p_k|^2}\right)} \quad (7) \\ &= \frac{h_k^* W h_k h_k^* W h_k}{\sum_{i \neq k} h_k^* W h_i h_i^* W h_k + \frac{K}{\rho} h_k^* W^2 h_k} \\ &= \frac{h_k^* W h_k h_k^* W h_k}{h_k^* W \left(HH^* - h_k h_k^* + \frac{K}{\rho} I_N\right) W h_k}.\end{aligned}$$

The goal is to find $F_{RF}$ to improve the SLNR in (7). Instead of assigning each column of $F_{RF}$ to each user, a subspace spanned by orthonormal bases $\{v_1, \ldots, v_M\}$ may be found where $v_m \in \mathbb{C}^N$ and $|v_m| = 1$, $\forall m = 1, \ldots, M$. Therefore, there is no constraint such as K=M, so this approach can be applied for the case of K<M as well. In at least some embodiments, allocating smaller users than M is better than allocating M users when M RF chains are given.

Let each column of $F_{RF}$ a linear combination of the bases, then $F_{RF}$ can be represented as $$F_{RF} = VA \quad (8)$$

where $A \in \mathbb{C}^{M \times M}$ is an invertible matrix and $V = [v_1 \ \ldots \ v_M] \in \mathbb{U}^{N \times M}$, where $\mathbb{U}^{N \times M}$ is a set of N×M semi-unitary matrices as $$\mathbb{U}^{N \times M} = \{X | X^* X = I_M, X \in \mathbb{C}^{N \times M}\}. \quad (9)$$

In the following proposition, SLNR in (7) has a maximum value when A is unitary, and thus $F_{RF}$ is semi-unitary.

Proposition 1: If V and $P_{tx}$ is given, SLNR in (7) is improved when A is unitary.

Proof: Let $\tilde{H}^* = H^* V$ and $\tilde{h}_k^* = h_k^* V$. Then, SLNR in (7) can be written as $$\begin{aligned}SLNR_k &= \frac{\tilde{h}_k^* A W A^* \tilde{h}_k \tilde{h}_k^* A W A^* \tilde{h}_k}{\tilde{h}_k^* A W A^* \left(\tilde{H} \tilde{H}^* - \tilde{h}_k \tilde{h}_k^* + \frac{K}{\rho} I_M\right) A W A^* \tilde{h}_k} \quad (10) \\ &= \frac{\tilde{h}_k^* \tilde{W}_A \tilde{h}_k \tilde{h}_k^* \tilde{W}_A \tilde{h}_k}{\tilde{h}_k^* \tilde{W}_A \left(\tilde{H} \tilde{H}^* - \tilde{h}_k \tilde{h}_k^* + \frac{K}{\rho} I_M\right) \tilde{W}_A \tilde{h}_k}\end{aligned}$$

-continued $$= \frac{\tilde{h}_k^* \tilde{W}_A \tilde{h}_k \tilde{h}_k^* \tilde{W}_A \tilde{h}_k}{\tilde{h}_k^* \tilde{W}_A \left(\tilde{H}\tilde{H}^* + \frac{K}{\rho}I_M\right)\tilde{W}_A \tilde{h}_k + \tilde{h}_k^* \tilde{W}_A \tilde{h}_k \tilde{h}_k^* \tilde{W}_A \tilde{h}_k},$$

where $$\tilde{W}_A = \left(\tilde{H}\tilde{H}^* + \frac{K}{\rho}(AA^*)^{-1}\right)^{-1}.$$

Let $\delta_A$ be defined as $$\delta_A = \frac{\tilde{h}_k^* A W A^* \tilde{h}_k \tilde{h}_k^* A W A^* \tilde{h}_k}{\tilde{h}_k^* \tilde{W}_A \left(\tilde{H}\tilde{H}^* + \frac{K}{\rho}I_M\right)\tilde{W}_A \tilde{h}_k} \quad (11)$$

$$= \frac{\widetilde{w_{A,k}^*} \tilde{h}_k \tilde{h}_k^* \widetilde{w_{A,k}}}{\widetilde{w_{A,k}^*}\left(\tilde{H}\tilde{H}^* - \tilde{h}_k \tilde{h}_k^* + \frac{K}{\rho}I_M\right)\widetilde{w_{A,k}}},$$

where $\widetilde{w_{A,k}} = \tilde{W}_A \tilde{h}_k$. Then, the SLNR in (10) can be rewritten as $$SLNR_k = \frac{\delta_A}{1-\delta_A} = \frac{1}{\frac{1}{\delta_A}-1} \quad (12)$$

Note that SLNR is improved when $\delta_A$ has a predetermined increased value. The $\widetilde{w_{A,k}}$ that improves $\delta_A$ has the same direction as the generalized eigenvector of $$\left(\tilde{H}\tilde{H}^* + \frac{K}{\rho}I_M \tilde{h}_k \tilde{h}_k^*\right).$$

Since $$\tilde{H}\tilde{H}^* + \frac{K}{\rho}I_M$$

is invertible, a solution of $\widetilde{w_{A,k}}$ has a form as $$\widetilde{w_{A,k}} \propto \text{the dominant eigenvector of} \quad (13)$$

$$\left(\tilde{H}\tilde{H}^* + \frac{K}{\rho}I_M\right)^{-1}\tilde{h}_k \tilde{h}_k^* \propto \left(\tilde{H}\tilde{H}^* + \frac{K}{\rho}I_M\right)^{-1}\tilde{h}_k,$$

which implies that $(AA^*)^{-1}=I_M$.

When A is unitary, $\delta_A$ has the maximal value of $$\delta_A = \tilde{h}_k^*\left(\tilde{H}\tilde{H}^* + \frac{K}{\rho}I_M\right)^{-1}\tilde{h}_k$$

and SLNR in (10) is expressed as $$SLNR_k = \frac{h_k^* V\left(V^* HH^* V + \frac{K}{\rho}I_M\right)^{-1}V^* h_k}{1 - h_k^* V\left(V^* HH^* V + \frac{K}{\rho}I_M\right)^{-1}V^* h_k} \quad (14)$$

$$= h_k^* V\left(V^*\left(\sum_{i \neq k}^{K} h_i h_i^*\right)V + \frac{K}{\rho}I_M\right)^{-1}V^* h_k$$

$$= h_{w,k}^* R_k^{\frac{1}{2}} V\left(\sum_{i \neq k}^{K} V^* R_i^{\frac{1}{2}} h_{w,i} h_{w,i}^* R_i^{\frac{1}{2}} V + \frac{K}{\rho}I_M\right)^{-1} V^* R_k^{\frac{1}{2}} h_{w,k}$$

where the second equality comes from the matrix inversion lemma.

Since SLNR is independent on A as long as A is unitary, constructing V in (8) may be performed to improve SLNR. Note that SLNR in (14) is a random variable due to $h_{w,k}$. The random variable SLNR, however, converges to a deterministic value as the number of antennas becomes large.

Let $$h_k = R_k^{\frac{1}{2}} h_{w,k} = \sqrt{N} R_k^{\frac{1}{2}} g_k,$$

where $g_k$ has IID complex entries with zero mean and variance of 1/N. Then, as N goes to infinity, the SLNR in (14) converges to $$SLNR_k = Ng_k^H R_k^{\frac{1}{2}} V\left(N\sum_{i \neq k}^{K} V^* R_i^{\frac{1}{2}} g_i g_i^* R_i^{\frac{1}{2}} V + \frac{K}{\rho}I_M\right)^{-1} V^* R_k^{\frac{1}{2}} g_k \quad (15)$$

$$\xrightarrow{a.s.} Tr\left(R_k^{\frac{1}{2}} V\left(N\sum_{i \neq k}^{K} V^* R_i^{\frac{1}{2}} g_i g_i^* R_i^{\frac{1}{2}} V + \frac{K}{\rho}I_M\right)^{-1} V^* R_k^{\frac{1}{2}}\right)$$

$$\xrightarrow{a.s.} Tr\left(R_k^{\frac{1}{2}} V\left(\sum_{i=1}^{K} V^* R_i^{\frac{1}{2}} g_i g_i^* R_i^{\frac{1}{2}} V + \frac{K}{\rho}I_M\right)^{-1} V^* R_k^{\frac{1}{2}}\right)$$

$$= Tr\left(V^* R_k V\left(\sum_{i=1}^{K} V^* R_i^{\frac{1}{2}} g_i g_i^* R_i^{\frac{1}{2}} V + \frac{K}{\rho}I_M\right)^{-1}\right)$$

where the first convergence comes from the trace lemma, and the second convergence comes from the rank-1 perturbation lemma.

The random variable SLNR is converged to a deterministic SLNR value, as N goes to infinity, as $$SLNR_k \xrightarrow{a.s.} \gamma_k, \quad (16)$$

where $\gamma_1, \ldots, \gamma_k$ are the unique nonnegative solution of $$\gamma_k = Tr\left(V^* R_k V\left(\sum_{j=1}^{K} \frac{V^* R_j V}{1+\gamma_j} + \frac{K}{\rho}I_M\right)^{-1}\right). \quad (17)$$

The solution of $\gamma_1, \ldots, \gamma_k$ can be obtained in fixed-point equations as $\gamma_k = \log_{t \to \infty} \gamma_k^{(t)}$ where $$\gamma_k^{(t)} = Tr\left(V^*R_kV\left(\sum_{j=1}^{K}\frac{V^*R_jV}{1+\gamma_j^{(t-1)}}+\frac{K}{\rho}I_M\right)^{-1}\right). \quad (18)$$

Let consider the problem that improves the asymptotic SLNR averaged over all users as $$\max_{V\in\mathbb{U}^{N\times M}}\frac{1}{K}\sum_{k=1}^{K}\gamma_k \quad (19)$$

$$\text{s.t. } \gamma_k = Tr\left(V^*R_kV\left(\sum_{j=1}^{K}\frac{V^*R_jV}{1+\gamma_j}+\frac{K}{\rho}I_M\right)^{-1}\right), \forall k.$$

Since this is difficult to solve directly due to K fixed point equations in (19), to relax the problem, presuming that all users have the same $$\text{SLNR as } \gamma_1 = \ldots = \gamma_k = \gamma = \frac{1}{K}\sum_{k=1}^{K}\gamma_k.$$

Then, the problem becomes $$\max_{V\in\mathbb{U}^{N\times M}}\gamma \quad (20)$$

$$\text{s.t. } \gamma = Tr\left(V^*R_{tot}V\left(\frac{KV^*R_{tot}V}{1+\gamma}+\frac{K}{\rho}I_M\right)^{-1}\right),$$

where $$R_{tot} = \frac{1}{K}\sum_{k=1}^{K}R_k.$$

Let $V^*R_{tot}$ be decomposed as $U\Lambda U^*$ by eigenvalue decomposition and have eigenvalues of $v_1, \ldots, v_M$ in descending order. Then, $\gamma$ is rewritten as $$\gamma = \frac{1}{K}Tr\left(U\Lambda U^*\left(\frac{U\Lambda U^*}{1+\gamma}+\frac{1}{\rho}I_M\right)^{-1}\right) \quad (21)$$

$$= \frac{1}{K}\sum_{m=1}^{\tilde{M}}\frac{1}{\frac{1}{1+\gamma}+\frac{1}{\rho v_m}}$$

where $\tilde{M}=\min(M, \text{rank}(R_{tot}))$. Then, a solution to (20) is given in the following proposition.

Proposition 2: The V that improves the SLNR in (20) is the matrix whose columns are composed of M eigenvectors associated with the M largest eigenvalues of $$R_{tot} = \frac{1}{K}\sum_{k=1}^{K}R_k.$$

Proof: Let $\lambda_1, \ldots, \lambda_N$ be the eigenvalues of $R_{tot}$ in descending order and $V_A=[V\ V_0]$ be a unitary matrix such that $V_0^*V_0=I_{N-M}$ and $V^*V_0=0_{M\times(N-M)}$. Since $V_A$ is a unitary matrix, $V_A^*R_{tot}V_a$ has the same eigenvalues as $R_{tot}$ and can be represented as $$V_A^*R_{tot}V_A = \begin{bmatrix} V^*R_{tot}V & V^*R_{tot}V_0 \\ V_0^*R_{tot}V & V_0^*R_{tot}V_0 \end{bmatrix}. \quad (22)$$

Let the eigenvalues of $V_A^*R_{tot}V_A$ be denoted as $v_1\geq\ldots\geq v_M$. Then, the eigenvalues of the leading principal submatrix, $V^*R_{tot}V$, have the interlacing property such as $$\lambda_{N-M+i}\leq v_i\leq\lambda_i, \text{ for } i=1,\ldots,M. \quad (23)$$

Since $R_{tot}$ is Hermitian, $\lambda_i$ for $i=1,\ldots,\text{rank}(R_{tot})$ have positive real values, and $\lambda_i$ for $i>\text{rank}(R_{tot})$ have zero values. Consequently, $v_i$ for $i>\text{rank}(R_{tot})$ become zeros, and $$\lambda_i^{-1}\leq v_i^{-1}\leq\lambda_{N-M+i}^{-1}, \text{ for } i=1,\ldots,\tilde{M}. \quad (24)$$

From (24), the constraint in (20) becomes $$\gamma = \frac{1}{K}\sum_{m=1}^{\tilde{M}}\frac{1}{\frac{1}{1+\gamma}+\frac{1}{\rho v_m}} \leq \frac{1}{K}\sum_{m=1}^{\tilde{M}}\frac{1}{\frac{1}{1+\gamma}+\frac{1}{\rho\lambda_m}}, \quad (25)$$

where the equality holds if V is composed of M dominant eigenvectors of $R_{tot}$. Since the solution of the fixed point equation with respect to $\gamma$ has the maximum value if the equality holds, the proof is completed.

The above proposition indicates that, in at least some embodiments, the analog precoding $F_{RF}$ to the problem in (20) uses the M dominant eigenvectors of $$R_{tot} = \frac{1}{K}\sum_{k=1}^{K}R_k,$$

e.g., the sum of the spatial covariance matrices of K users.

Although the derived solution is based on the relaxed problem assuming that large antenna arrays are equipped and the SLNR per user is approximated to the average value over users, this approximated solution significantly outperforms conventional techniques and has spectral efficiency close to that of the fully digital precoding in spatially correlated channels. In addition, it can be proved that the proposed solution has exactly the same spectral efficiency as that of the fully digital precoding if $R_{tot}$ is rank-deficient and its rank is less than or equal to M.

Even when the number of antennas is not so large and thus the SLNR does not converge to a certain value, it can be proved that the proposed analog precoding is beneficial in the sense that at least some implementations improve the lower bound of the expectation of the SLNR averaged over K users. The expectation of the average SLNR over K users can be expressed as $$\mathbb{E}\left[\frac{1}{K}\sum_{k=1}^{K}SLNR_k\right] = Tr\left(\frac{1}{K}\sum_{k=1}^{K}\mathbb{E}\left[V^*R_k^{\frac{1}{2}}h_{w,k}h_{w,k}^*R_k^{\frac{1}{2}}V\left(\sum_{i\neq k}V^*R_i^{\frac{1}{2}}h_{w,i}h_{w,i}^*R_i^{\frac{1}{2}}V+\frac{K}{\rho}I_M\right)^{-1}\right]\right) \quad (26)$$

$$= Tr\left(\frac{1}{K}\sum_{k=1}^{K}\mathbb{E}\left[V^*R_k^{\frac{1}{2}}h_{w,k}h_{w,k}^*R_k^{\frac{1}{2}}V\right]\mathbb{E}\left[\left(\sum_{i\neq k}V^*R_i^{\frac{1}{2}}h_{w,i}h_{w,i}^*R_i^{\frac{1}{2}}V+\frac{K}{\rho}I_M\right)^{-1}\right]\right)$$

$$\geq Tr\left(\frac{1}{K}\sum_{k=1}^{K}V^*R_kV\left(\sum_{i\neq k}V^*R_iV+\frac{K}{\rho}I_M\right)^{-1}\right)$$

$$\geq Tr\left(\frac{1}{K}\sum_{k=1}^{K}V^*R_kV\left(\sum_{i=k}^{K}V^*R_iV+\frac{K}{\rho}I_M\right)^{-1}\right).$$

where the second equality comes from the fact that $h_{w,k}$'s are independent, and the first inequality comes from the fact that $\mathbb{E}[A^{-1}]-(\mathbb{E}[A])^{-1}$ is a positive semidefinite for a positive semidefinite matrix A, and the second inequality comes from the fact that $A^{-1}-(A+B)^{-1}$ is a positive semidefinite for a positive semidefinite matrix A and B.

With the same notation used in (20) and (21), the lower bound in (26) can be represented as $$\mathbb{E}\left[\frac{1}{K}\sum_{k=1}^{K}SLNR_k\right] \geq Tr\left(\frac{1}{K}V^*R_{tot}V\left(V^*R_{tot}V+\frac{K}{\rho}I_M\right)^{-1}\right) = \quad (27)$$

$$\sum_{m=1}^{\tilde{M}}\frac{1}{K+\frac{\rho}{v_m}}.$$

This lower bound expression in (27) has a similar form to (21), and it can be easily proved that the V that improves the expected average SLNR is the same as the solution in Proposition 2.

For an embodiment, RF chains construct a subspace for all users as a whole in the analog precoding. For this reason, there is no limitation on assigning the exactly same number of the users to the number of the RF chains, providing a wide range of applicability of the proposed method.

In at least some embodiments, hybrid precoding under a phase shifter using long-term channel statistics may be used, where constraints 1, 2, and 3 are applied, where $F_{RF}$ is composed of phase shifters. Specifically, at least some embodiments provide a technique to mimic $F_{RF}$ under the phase shifter constraint. The unconstrained $F_{RF}$ may be derived as $F_{RF,UC}$ and its constrained version as $F_{RF,C}$.

For an embodiment, the following algorithm may be used.
Algorithm 1 Find $F_{RF,C}$
Input: $F_{RF,UC}$
Initialization: $F_{(0)}=\angle(F_{RF,UC})$, n=0
repeat
$\quad$ n←n+1
$\quad F_{(n)}=\angle(F_{RF,UC}F_{RF,UC}^*F_{(n-1)})$
until $\|F_{RF,UC}F_{RF,UC}^*F_{(n-1)}-F_{(n)}\|_F$ converges
Output: $F_{RF,UC}=F_{(n)}$ The previous way to make $F_{RF,C}$ as similar to $F_{RF,UC}$ as possible is presented. A simple way to find the most similar $F_{RF,C}$ is solving $$\min_{F_{RF,C},|[F_{RF,C}]_{i,j}|=\frac{1}{\sqrt{N}}} \|F_{RF,UC}-F_{RF,C}\|_F^2. \quad (28)$$

$F_{RF,C}$ that decreases the Frobenius norm of the difference between $F_{RF,C}$ and $F_{RF,UC}$ is known as a reasonable approximation of $F_{RF,UC}$. The solution of (28) is given by $$[F_{RF,C}^{(opt)}]_{i,j} = \frac{1}{\sqrt{N}}e^{j\angle([F_{RF,UC}]_{i,j})},$$

where $\angle(\alpha)$ denotes the phase of a complex number a. The weakness of this approach is that $F_{RF,C}$ loses the orthogonality that $F_{RF,UC}$ retains. Recall that $F_{RF,UC}$ may be semi-unitary according to Proposition 1.

In at least some embodiments, to overcome this weakness, a compensation matrix in the baseband part is applied to restore the orthogonality lost in the analog part as shown in FIG. 2. The compensation matrix $F_{CM}$ is designed by $$F_{CM} = (F_{RF,C}^*F_{RF,C})^{-\frac{1}{2}}, \quad (29)$$

which makes $F_{RF,C}F_{CM}$ semi-unitary. By applying the compensation matrix, additional room is made for further improvement in designing $F_{RF,C}$. Denote A as an arbitrary invertible matrix, which is decomposed by SVD as $U_AD_AV_A^*$. Suppose that $F_{RF,UC}A$ is used instead of $F_{RF,UC}$ in the unconstrained case. The unconstrained analog precoder combined with the compensation matrix becomes $$F_{RF,UC}AF_{CM} = F_{RF,UC}A(A^*F_{RF,C}^*F_{RF,C})^{-\frac{1}{2}} = F_{RF,UC}U_A, \quad (30)$$

which satisfies the criterion as in the unconstrained analog precoding. Therefore, the unconstrained analog precoding $F_{RF,UC}$ can be replaced by $F_{RF,UC}A$ for any invertible matrix A without any performance loss. Using this property, a modified problem may be used instead of (28) as $$\min_{F_{RF,C},|[F_{RF,C}]_{i,j}|=1,A} \|F_{RF,UC}A-F_{RF,C}\|_F^2. \quad (31)$$

Thanks to the increased degrees of freedom of the design, the constrained analog precoding $F_{RF,C}$ can be made closer to constrained analog precoding. The solution to (31) can be obtained by an alternating technique. In at least some embodiments, the algorithm firstly finds the optimal A assuming that $F_{RF,C}$ is fixed. Given a fixed $F_{RF,C}$, the optimal A is given by $$A^{(opt)} = \arg\min_{A} \|F_{RF,UC}A - F_{RF,C}\|_F^2 = F_{RF,UC}^* F_{RF,C}. \quad (32)$$

Then, assuming that A is fixed, the optimal $F_{RF,C}$ is given by $$F_{RF,C}^{(opt)} = \min_{F_{RF,C},|[F_{RF,C}]_{i,j}|=1} \|F_{RF,UC}A - F_{RF,C}\|_F^2 = \angle(F_{RF,UC}A). \quad (33)$$

where $\angle(X)$ is a matrix whose (i,j)-th element is $e^{j\angle([X]_{i,j})}$. Using (32) and (33), the solution can be obtained from an iterative algorithm described in Algorithm 1.

Once $F_{RF,C}$ is decided, the compensation matrix $F_{CM}$ is obtained from $F_{RF,C}$ and (29). The overall baseband precoding in the constrained case is $$F_{BB,C} = F_{CM} F_{RZF}, \quad (34)$$

where $F_{RZF}$ is an RZF precoder with respect to the effective channel $H_{eff,c} = H^* F_{RF,C} F_{CM}$ as $$F_{RZF} = (H_{eff,c}^* H_{eff,c} + \beta I_M)^{-1} H_{eff,c}^*. \quad (35)$$

Algorithm 2 summarizes the overall process for the hybrid precoding design under Constraint 1, 2, and 3.

For an embodiment, the following algorithm may be used.
Algorithm 2 Hybrid Precoding Design for Multiuser Massive MIMO
Step 1: Find an unconstrained analog precoding matrix $F_{RF,UC}$ $$F_{RF,UC} = M \text{ dominant eigenvectors of} \sum_{k=1}^{K} R_k$$

Step 2: Find a constrained analog precoding matrix $F_{RF,C}$ using Algorithm 1
Step 3: Construct a baseband compensation matrix, $F_{CM}$ as $$F_{CM} = (F_{RF,C}^* F_{RF,C})^{-\frac{1}{2}}$$

Step 4: Construct a baseband RZF precoding matrix, $F_{RZF}$, as $$F_{RZF} = (F_{CM}^* F_{RF}^* H H^* F_{CM} + \beta I_M)^{-1} F_{CM}^* F_{RF}^* H$$

Step 5: Construct an overall baseband precoding matrix $F_{BB,C}$ and an overall hybrid precoding matrix $F_{HB}$ as $$F_{BB,C} = F_{CM} F_{RZF}, \; F_{HC} = F_{RF,C} F_{BB,C} = F_{RF,C} F_{CM} F_{RZF}$$

For an embodiment, as a measure of the loss, the ratio of the asymptotic SLNR may be averaged over K users of the hybrid precoding to that of the full digital precoding. Similarly to the hybrid precoding case, the asymptotic SLNR of user k in the fully digital precoding case can be represented as $$SNLR_k^{(FD)} \xrightarrow{a.s.} \gamma_k^{(FD)}, \quad (36)$$

where $\gamma_1^{(FD)}, \ldots, \gamma_k^{(FD)}$ are the unique nonnegative solution of $$\gamma_k^{(FD)} = Tr\left(R_k \left(\sum_{j=1}^{K} \frac{R_j}{1+\gamma_j^{(FD)}} + \frac{K}{\rho} I_N\right)^{-1}\right). \quad (37)$$

Let $\gamma_k^{(HB)}$ denote the asymptotic SLNR of the hybrid precoding in (16). Then, the performance metric may be defined as $$\eta = \frac{\frac{1}{K}\sum_{k=1}^{K} \gamma_k^{(HB)}}{\frac{1}{K}\sum_{k=1}^{K} \gamma_k^{(FD)}}, \quad (38)$$

and $\eta$ satisfies $0 \leq \eta \leq 1$. Note that $10 \log_{10} \eta$ indicates the average SLNR loss in dB caused by the hybrid precoding compared to the fully digital precoding. Therefore, if $R_1, \ldots, R_k$ are given, the SLNR loss can be calculated by using (16), (36), and (38). The SLNR loss, however, does not have a closed form due to the fixed point equations.

In the following propositions, some special cases are introduced where the SLNR loss metric has a closed form. For a general case, an approximation of the SLNR loss metric in Proposition 5 may be derived. Notations of $$\kappa = \frac{K}{N}$$

and $$\mu = \frac{M}{N}$$

may be used mat denote the relative number of users and RF chains compared to the number of antennas in the SLNR loss analysis. This presumes that $\kappa$ and $\mu$ have constant values without converging to zero as N goes to infinity. Note that $0 \leq \kappa \leq \mu \leq 1$.

Proposition 3: For uncorrelated channels, e.g., $R_k = I_n$, $\forall k$, the SLNR loss metric $\eta$ is a function of $\kappa$, $\mu$, and $\rho$ as $$\eta = \frac{((\mu-\kappa)\rho - \kappa) + \sqrt{((\mu-\kappa)\rho - \kappa)^2 + 4\mu\kappa\rho}}{((1-\kappa)\rho - \kappa) + \sqrt{((1-\kappa)\rho - \kappa)^2 + 4\kappa\rho}}, \quad (39)$$

and if $\rho \to \infty$ and $\mu > \kappa$, then $\eta$ can be approximated to $$\eta = \frac{\mu - \kappa}{1 - \kappa}. \quad (40)$$

Proof: When $R_k=I_N, \forall k, \gamma_k^{(FD)}$ in (37) is given by $$\gamma_k^{(FD)} = Tr\left(\left(\sum_{j=1}^{K}\frac{1}{1+\gamma_j^{(FD)}} + \frac{K}{\rho}I_N\right)^{-1}\right) \quad (41)$$

$$= \frac{N}{\sum_{j=1}^{K}\frac{1}{1+\gamma_j^{(FD)}} + \frac{K}{\rho}}, \forall k,$$

which implies $$\gamma_1^{(FD)} = \ldots = \gamma_K^{(FD)} = \gamma^{(FD)} = \frac{N}{\frac{K}{1+\gamma_j^{(FD)}} + \frac{K}{\rho}} = \frac{1}{\frac{\kappa}{1+\gamma_j^{(FD)}} + \frac{\kappa}{\rho}},$$

and the positive solution of $\gamma^{(FD)}$ to this equation becomes the numerator in (39). In a similar way, it can be proved that $\gamma_1^{(HB)} = \ldots = \gamma_K^{(HB)} = \gamma^{(HB)}$ and $\gamma^{(HB)}$ is given by the denominator in (39), using the fact that $R_{tot}$ is an identity matrix. If $\rho \to \infty$ and $\mu \gg \kappa$, then $\eta$ converges as (40).

At high SNR region ($\rho \to \infty$) in the uncorrelated channels, the SLNR loss caused by the hybrid precoding in (40) is negligible if $\mu \to 1$, e.g., $M \approx N$. Furthermore, as $\kappa$ approaches to $\mu$, e.g., $$\frac{K}{M} \to 1,$$

the SLINK loss becomes disastrous.

In the next proposition, the SLNR loss decreases as the channels become more spatially correlated. In this correlated case, the covariance matrix $R_k$ is likely to be ill-conditioned, e.g., the eigenvalues are not evenly distributed, and a few dominant eigenvalues account for most of the sum of all the eigenvalues. The following proposition shows an extreme case where there is no SLNR loss from the hybrid precoding in the correlated channels.

Proposition 4: For correlated channels, if $\Sigma_{k=1}^{K}R_k$ is rank-deficient and its rank is lower than or equal to M, then the SLNR loss metric $\eta$ is equal to one, e.g., the hybrid precoding has the same asymptotic SLNR as that of the fully digital precoding.

Proof: Let the rank of $R_{tot}$ be $\tilde{M} \leq M$ and $V_{\tilde{M}}$ be the eigenvector associated with its nonzero eigenvalues. Since the rank of $R_{tot} = \Sigma_{k=1}^{K}R_k$ is $\tilde{M} \leq N$, the rank of each user's covariance matrix $R_k$ becomes at most $\tilde{M}$ and thus can be represented as $R_k = V_{\tilde{M}}Q_k V_{\tilde{M}}^*$ where $Q_k \in \mathbb{C}^{\tilde{M} \times \tilde{M}}$. Note that this is not an eigenvalue decomposition, so $Q_k$ is generally not a diagonal matrix. In the proposed hybrid precoding technique, the analog precoding without the phase shifter constraint is given by $F_{RF}=[V_{\tilde{M}} \; 0]$ which means that $\tilde{M}$ RF chains are used among M ones. From (17), the deterministic SLNR of user k in the hybrid precoding case is the unique nonnegative solution of $$\gamma_k^{(HB)} = Tr\left(F_{RF}^* R_k F_{RF}\left(\sum_{j=1}^{K}\frac{F_{RF}^* R_j F_{RF}}{1+\gamma_j^{(HB)}} + \frac{K}{\rho}I_M\right)^{-1}\right) = \quad (42)$$

$$Tr\left(\begin{bmatrix}Q_k & 0 \\ 0 & 0_{M-\tilde{M}}\end{bmatrix}\left(\sum_{j=1}^{K}\frac{1}{1+\gamma_j^{(HB)}}\begin{bmatrix}Q_j & 0 \\ 0 & 0_{M-\tilde{M}}\end{bmatrix} + \frac{K}{\rho}I_M\right)^{-1}\right) =$$

$$Tr\left(Q_k\left(\sum_{j=1}^{K}\frac{Q_j}{1+\gamma_j^{(HB)}} + \frac{K}{\rho}I_{\tilde{M}}\right)^{-1}\right)$$

Let $V_A = [V_{\tilde{M}} \; V_{N-\tilde{M}}]$ be a unitary matrix where $V_{N-\tilde{M}}$ is the null space of $V_{\tilde{M}}$ such that $V_{\tilde{M}}^* V_{N-\tilde{M}} = 0_{\tilde{M} \times (N-\tilde{M})}$ and $V_{N-\tilde{M}}^* V_{N-\tilde{M}} = I_{N-\tilde{M}}$. In the fully digital precoding case, the fixed point equation of the deterministic SLNR of user k in (37) can be reformulated as $$\gamma_k^{(FD)} = \quad (43)$$

$$Tr\left(V_{\tilde{M}}Q_k V_{\tilde{M}}^*\left(\sum_{j=1}^{K}\frac{V_{\tilde{M}}Q_j V_{\tilde{M}}^*}{1+\gamma_j^{(FD)}} + \frac{K}{\rho}I_N\right)^{-1}\right) = Tr\left(V_A \begin{bmatrix}Q_k & 0 \\ 0 & 0_{M-\tilde{M}}\end{bmatrix}\right.$$

$$\left. V_A^*\left(\sum_{j=1}^{K}\frac{1}{1+\gamma_j^{(HB)}}V_A\begin{bmatrix}Q_j & 0 \\ 0 & 0_{M-\tilde{M}}\end{bmatrix}V_A^* + \frac{K}{\rho}I_N\right)^{-1}\right) =$$

$$Tr\left(\begin{bmatrix}Q_k & 0 \\ 0 & 0_{M-\tilde{M}}\end{bmatrix}\left(\sum_{j=1}^{K}\frac{1}{1+\gamma_j^{(HB)}}\begin{bmatrix}Q_j & 0 \\ 0 & 0_{M-\tilde{M}}\end{bmatrix} + \frac{K}{\rho}I_N\right)^{-1}\right) =$$

$$Tr\left(Q_k\left(\sum_{j=1}^{K}\frac{Q_j}{1+\gamma_j^{(FD)}} + \frac{K}{\rho}I_{\tilde{M}}\right)^{-1}\right)$$

Since (42) is identical to (43), and the solution of these fixed point equations have a unique solution, the proof is completed.

Consider a general correlated channel case where the rank of $R_{tot}$ is not strictly less than M. Although the (N−M) smallest eigenvalues are not exactly zeros, it is possible for those eigenvalues to become much smaller than the other dominant eigenvalues in the highly correlated channels. It is intuitive that the smaller those non-dominant eigenvalues are, the smaller the loss from the hybrid precoding. A question still remains about how much the exact loss will be according to the portions of the small eigenvalues. For quantitative analysis, Let $\lambda_1, \ldots, \lambda_N$ be the nonnegative eigenvalues of $R_{tot}$ in descending order and define a metric, $\tau$, as the ratio of the sum of M largest eigenvalues to the sum of all eigenvalues, e.g., $$\tau = \frac{\sum_{i=1}^{M}\lambda_i}{\sum_{i=1}^{N}\lambda_i}.$$

This metric $\tau$ ranging from $$\mu\left(=\frac{M}{N}\right)$$

to 1 can be regarded as the metric that indicates how concentrated the eigenvalues are. The goal of the quantitative analysis here is to express the SLNR loss $\eta$ as a function of the concentration metric i and other system parameters such as $$\kappa\left(=\frac{K}{N}\right)$$

and $$\mu\left(=\frac{M}{N}\right),$$

which can provide a useful insight to the relation between both metrics.

The closed form expressions on the SLNR metric $\eta$ in Proposition 3 and 4 are the special cases when $\tau=\mu$ and $\tau=1$, respectively. The SLNR loss metric $\eta$, however, does not have a closed form expression if $\mu<\tau<1$. Instead of pursing exact expressions, two approximations may be used to get an insight to the impact of $\tau$ and other parameters on $\eta$. First, all users' deterministic SLNR's are the same as the average value used previously. Second, all the M largest eigenvalues have an identical value that is their average values as $$\bar{\lambda}_L = \frac{1}{M}\sum_{i=1}^{M}\lambda_i = \frac{\tau}{M}Tr(R_{tot}), \tag{44}$$

and the N–M remaining eigenvalues have the same value as $$\bar{\lambda}_S = \frac{1}{N-M}\sum_{i=M+1}^{N}\lambda_i = \frac{1-\tau}{N-M}Tr(R_{tot}). \tag{45}$$

From (21) and the above assumptions, the deterministic SLNR of the hybrid precoding and the fully digital precoding are the nonnegative unique solution of $$\gamma^{(HB)} = \frac{1}{K}\sum_{m=1}^{M}\frac{1}{\frac{1}{1+\gamma^{(HB)}}+\frac{1}{\rho\lambda_m}} = \frac{1}{K}\frac{M}{\frac{1}{1+\gamma^{(HB)}}+\frac{1}{\rho\bar{\lambda}_L}}, \tag{46}$$

and $$\gamma^{(FD)} = \frac{1}{K}\sum_{m=1}^{M}\frac{1}{\frac{1}{1+\gamma^{(FD)}}+\frac{1}{\rho\lambda_m}} = \tag{47}$$

$$\frac{1}{K}\frac{M}{\frac{1}{1+\gamma^{(FD)}}+\frac{1}{\rho\bar{\lambda}_L}} + \frac{1}{K}\frac{N-M}{\frac{1}{1+\gamma^{(FD)}}+\frac{1}{\rho\bar{\lambda}_S}}$$

respectively. In the following proposition, the approximate SLNR loss metric $\eta$ using the above two assumptions is derived in a closed form.

Proposition 5: For the spatially correlated channels where $Tr(R_k)=N$ for all k as the uncorrelated channel case in (40), the SLNR loss metric $\eta$ approximates to $$\eta \approx \frac{(B-A-AB)+\sqrt{(B-A-AB)^2+4AB^2}}{-6\left(\frac{1}{D}+\frac{1}{\omega H}+\frac{\omega H}{G}\right)-2}, \tag{48}$$

where $$\omega = -\frac{1}{2}+\frac{1}{2}\sqrt{3}\,i$$

and $$A = \frac{\kappa}{\rho\tau}, \tag{49}$$

$$B = \frac{\mu}{\rho\tau},$$

$$C = \frac{1-\mu}{(\rho(1-\tau))},$$

$$D = B+C+\frac{1-\kappa}{\kappa},$$

$$E = BC\left(\frac{\rho+\kappa}{\kappa}\right)-B-C$$

$$G = D^2 - 3E,$$

$$H = \left(\frac{G+\left((2D^3-9DE-27BC)^2-4G^3\right)^{\frac{1}{2}}}{2}\right)^{\frac{1}{3}}.$$

Proof: From (21) and the above assumptions, the deterministic SLNR of the hybrid precoding is the nonnegative unique solution of $$\gamma^{(HB)} = \frac{1}{K}\frac{M}{\frac{1}{1+\gamma^{(HB)}}+\frac{1}{\rho\bar{\lambda}_L}} = \frac{\mu/\kappa}{\frac{1}{1+\gamma^{(HB)}}+\frac{\mu}{\rho\tau}}, \tag{50}$$

and the solution is given by $$\gamma^{(HB)} = \frac{\left(\left(\frac{1}{\kappa}-\frac{1}{\mu}\right)\rho\tau-1\right)+\sqrt{\left(\left(\frac{1}{\kappa}-\frac{1}{\mu}\right)\rho\tau-1\right)^2+4\frac{\rho\tau}{\kappa}}}{2}, \tag{51}$$

$$= \frac{\left(\left(\frac{1}{A}-\frac{1}{B}\right)-1\right)+\sqrt{\left(\left(\frac{1}{A}-\frac{1}{B}\right)-1\right)^2+\frac{4}{A}}}{2},$$

where $$A = \frac{\kappa}{\rho\tau}$$

and $$B = \frac{\mu}{\rho\tau}.$$

In the fully digital precoding case, the deterministic SLNR is the solution of $$\gamma^{(FD)} = \frac{1}{K}\frac{M}{\frac{1}{1+\gamma^{(FD)}} + \frac{1}{\rho\overline{\lambda}_L}} = \frac{1}{K}\frac{N-M}{\frac{1}{1+\gamma^{(FD)}} + \frac{1}{\rho\overline{\lambda}_S}}, \quad (52)$$

$$= \frac{1}{\kappa}\left(\frac{M}{\frac{1}{\mu(1+\gamma^{(FD)})} + \frac{1}{\rho\tau}} = \frac{N-M}{\frac{1}{(1-\mu)(1+\gamma^{(FD)})} + \frac{1}{\rho(1-\tau)}}\right).$$

Let $$C = \frac{1-\mu}{\rho(1-\tau)},$$

then the equation (52) can be simplified as $$(\gamma^{(FD)})^3 + \left(B + C + \frac{1-\kappa}{\kappa}\right)(\gamma^{(FD)})^2 + \quad (53)$$

$$\left(BC\left(\frac{\rho-\kappa}{\kappa}\right) - B - C\right)\gamma^{(FD)} - BC = 0.$$

Let $$D = B + c + \frac{1-\kappa}{\kappa}$$

and $$E = BC\left(\frac{\rho+\kappa}{\kappa}\right) - B - C.$$

The nonnegative solution of (53) is given by $$\gamma^{(FD)} = -3\left(\frac{1}{D} + \frac{1}{\omega H} + \frac{\omega H}{G}\right) - 1 \quad (54)$$

where $$\omega = -\frac{1}{2} + \frac{1}{2}\sqrt{3}\,i,$$

$$G = D^2 - 3E, \text{ and } H = \left(\frac{G + ((2D^3 - 9DE - 27BC)^2 - 4G^3)^{\frac{1}{2}}}{2}\right)^{\frac{1}{3}}.$$

From (51) and (54), the approximate SLNR loss metric becomes (48).

The approximate SLNR loss metric in (48) is a decreasing function with respect to τ. Since the range of τ is $\mu \leq \tau \leq 1$, the metric has a minimum value of (39) when τ=μ (uncorrelated channels), and a maximum value of one when τ=1 (correlated channels with rank($R_{tot}$)=M). The approximate SLNR loss metric also depends on three other factors:

$$\mu\left(=\frac{M}{N}\right), \kappa\left(=\frac{K}{N}\right), \text{ and } \rho\left(=\frac{P_{tx}}{\sigma^2}\right).$$

Although specific embodiments have been described and illustrated, the embodiments are not to be limited to the specific forms or arrangements of parts so described and illustrated. The described embodiments are to only be limited by the claims.

What is claimed:

1. A base station, comprising:
baseband precoding circuitry, wherein the baseband precoding circuitry receives K inputs and digitally multiplies the K inputs with a multiple-input multiple-output (MIMO) precoding matrix ($F_{MU}$) generating M outputs, and wherein K indicates a number of users communicating with the base station;
a compensation circuitry, wherein the compensation circuitry digitally multiplies the M outputs of the baseband precoding circuitry with a compensation matrix ($F_{CM}$) generating M compensation outputs;
M radio frequency (RF) chains, wherein each RF chain is configured to receive one of the M compensation outputs, and generate an analog frequency-up-converted signal; and
analog precoding circuitry, wherein the analog precoding circuitry receives the M analog frequency-up-converted signals and analog multiplies the M analog frequency-up-converted signals with a constrained analog precoding matrix ($F_R$) generating N output signals for transmission, wherein N is greater than M;
wherein the constrained analog precoding matrix ($F_{RF}$) is determined based on an unconstrained analog precoding matrix ($F_{RF,UC}$), and wherein the unconstrained analog precoding matrix ($F_{RF,UC}$) is determined based on dominant eigenvectors of the sum of spatial channel covariance matrices of the K users; and
wherein the compensation matrix ($F_{CM}$) is determined based on the constrained analog precoding matrix ($F_{RE}$).

2. The base station of claim 1, wherein K is less than or equal to M.

3. The base station of claim 1, wherein multiplication of the unconstrained analog precoding matrix ($F_{RF,UC}$) with any invertible matrix is substantially equal to the constrained analog precoding matrix ($F_{RF}$).

4. The base station of claim 1, wherein the MIMO precoding matrix ($F_{MU}$) is determined based on an effective channel matrix that comprises one or more of the constrained analog precoding matrix ($F_{RF}$), the compensation matrix ($F_{CM}$), and a raw channel matrix.

5. The base station of claim 1, wherein the constrained analog precoding circuitry comprises phase shifters, and wherein the analog multiplication of the unconstrained analog precoding matrix ($F_{RF,UC}$) controls phases of the analog frequency-up-converted signals.

6. The base station of claim 1, wherein the constrained analog precoding circuitry comprises phase shifters, wherein multiplication of the constrained analog precoding matrix ($F_{RF}$) and the compensation matrix ($F_{CM}$) is substantially equal to the unconstrained analog precoding matrix ($F_{RF,UC}$).

7. A method, comprising:
   determining an unconstrained analog precoding matrix ($F_{RF,UC}$), wherein the unconstrained analog precoding matrix ($F_{RF,UC}$) is determined based on M dominant eigenvectors of the sum of spatial channel covariance matrices of K users, and wherein K indicates a number of users communicating with a base station;
   determining a constrained analog precoding matrix ($F_{RF}$) based on the unconstrained analog precoding matrix ($F_{RF,UC}$);
   determining a compensation matrix ($F_{CM}$), wherein the compensation matrix ($F_{CM}$) is determined based on the constrained analog precoding matrix ($F_{RF}$);
   digitally multiplying K inputs with a multiple-input multiple-output (MIMO) precoding matrix ($F_{MU}$) generating M outputs;
   digitally multiplying the M outputs with the compensation matrix ($F_{CM}$) generating M compensation outputs;
   generating M analog frequency-up-converted signals based on the M compensation outputs; and
   analog multiplying the M analog frequency-up-converted signals with the analog precoding matrix ($F_{RF}$) generating N output signals for transmission, wherein N is greater than M.

8. The method of claim 7, wherein K is less than or equal to M.

9. The method of claim 7, wherein multiplication of the unconstrained analog precoding matrix ($F_{RF,UC}$) with any invertible matrix is substantially equal to the constrained analog precoding matrix ($F_{RF}$).

10. The method of claim 7, wherein the MIMO precoding matrix ($F_{MU}$) is determined based on an effective channel matrix that comprises one or more of the constrained analog precoding matrix ($F_{RF}$), the compensation matrix ($F_{CM}$), and a raw channel matrix.

11. The method of claim 7, wherein the constrained analog precoding circuitry comprises phase shifters, and wherein the analog multiplication of the unconstrained analog precoding matrix ($F_{RF,UC}$) controls phases of the analog frequency-up-converted signals.

12. The method of claim 7, wherein the constrained analog precoding circuitry comprises phase shifters, wherein multiplication of the constrained analog precoding matrix ($F_{RF}$) and the compensation matrix ($F_{CM}$) is substantially equal to the unconstrained analog precoding matrix ($F_{RF,UC}$).

13. A system, comprising:
    one or more processors; and
    a non-transitory computer-readable storage device including one or more instructions for execution by the one or more processors and when executed operable to perform operations comprising:
    determining an unconstrained analog precoding matrix ($F_{RF,UC}$), wherein the unconstrained analog precoding matrix ($F_{RF,UC}$) is determined based on dominant eigenvectors of the sum of spatial channel covariance matrices of K users, and wherein K indicates a number of users communicating with a base station;
    determining a constrained analog precoding matrix ($F_{RF}$) based on the unconstrained analog precoding matrix ($F_{RF,UC}$);
    determining a compensation matrix ($F_{CM}$), wherein the compensation matrix ($F_{CM}$) is determined based on the constrained analog precoding ($F_{RF}$);
    digitally multiplying K inputs with a multiple-input multiple-output (MIMO) precoding matrix ($F_{MU}$) generating M outputs;
    digitally multiplying the M outputs with the compensation matrix ($F_{CM}$) generating M compensation outputs;
    generating M analog frequency-up-converted signals based on the M compensation outputs; and
    analog multiplying the M analog frequency-up-converted signals with the analog precoding matrix ($F_{RF}$) generating N output signals for transmission, wherein N is greater than M.

14. The system of claim 13, wherein K is less than or equal to M.

15. The system of claim 13, wherein multiplication of the unconstrained analog precoding matrix ($F_{RF,UC}$) with any invertible matrix is substantially equal to the constrained analog precoding matrix ($F_{RF}$).

16. The system of claim 13, wherein the MIMO precoding matrix ($F_{MU}$) is determined based on an effective channel matrix that comprises one or more of the constrained analog precoding matrix ($F_{RF}$), the compensation matrix ($F_{CM}$), and a raw channel matrix.

17. The system of claim 13, wherein the constrained analog precoding circuitry comprises phase shifters, and wherein the analog multiplication of the unconstrained analog precoding matrix ($F_{RF,UC}$) controls phases of the analog frequency-up-converted signals.

* * * * *